Patented May 19, 1942

2,283,196

UNITED STATES PATENT OFFICE 2,283,196

RECOVERY OF GOLD FROM TELLURIDE ORES

Colin G. Fink and Garth Louis Putnam, New York, N. Y.

No Drawing. Application November 1, 1940, Serial No. 363,895

1 Claim. (Cl. 75—105)

The present invention relates to the recovery of gold from telluride ores by leaching with ammonia copper cyanide solutions. A purpose of the invention is to provide an efficient solvent for gold telluride minerals.

It is well known that ammonia copper cyanide solutions are excellent solvents for metallic gold and silver, but no one has ever shown that such solutions will dissolve gold tellurides. Heretofore, ammonia copper cyanide solutions have been used exclusively for the purpose of overcoming the deleterious effects of certain copper minerals which are soluble in alkali cyanides.

It may be noted that as the reactions of compounds generally differ from the reactions of the constituent elements, one would predict that solvents for gold would not always be applicable to the telluride compounds of gold; and this prediction is amply confirmed by the experience of metallurgists. Telluride ores are seldom amenable to direct cyanidation and are usually roasted prior to the cyanide treatment in order to decompose the gold telluride compounds.

The basis of our invention is the experimentally discovered fact that ammonia copper cyanide solutions have an extraordinarily rapid action on gold tellurides. Samples of a finely ground calaverite ($AuTe_2$) concentrate weighing 500 mg. each were treated with: (1), a sodium cyanide solution containing 2.5 grams per liter; and (2), a solution which contained in every liter 1.0 gram of sodium cyanide, 0.57 gram of copper, 20 grams of free ammonia, and 10 grams of ammonium carbonate. Under otherwise identical conditions the ammonia copper cyanide solution dissolved 18 to 60 times as much gold as did the sodium cyanide solution. When gold foil was substituted for the calaverite, (2) dissolved only twice as much gold as did (1).

In carrying out the invention an excess of divalent copper should be present in the leaching solvent, which then has a distinct blue color. Alkali or alkaline earth cyanides should never be added in sufficient amounts to completely discharge the blue color.

Below are given two examples which illustrate methods by which the invention may be applied:

1. To 100 parts of a solution containing 0.50 part of free ammonia, 0.20 part of ammonium sulfate, 0.50 part of crystalline copper sulfate ($CuSO_4 \cdot 5H_2O$), and 0.10 part of sodium cyanide, the reagents being added in the order given, were added 100 parts of calaverite ore assaying 1.15 oz. of gold per ton. On agitating the pulp for 12 hours, filtering, washing, and assaying a dry sample of the tailings, it was found that 95 per cent of the gold content of the ore had been extracted.

2. To 100 parts of a solution containing 0.40 part of free ammonia, 0.20 part of ammonium carbonate, 0.20 part of copper (added in the form of malachite), and 0.10 part of sodium cyanide were added 100 parts of sylvanite ore assaying 1.38 oz. of gold per ton. On agitating the pulp for 12 hours, filtering, washing, and assaying a sample of the dried ore residue it was found that 92 per cent of the gold content had been extracted from the ore.

Having thus described our invention, what we claim is:

For extracting gold from ores which have not been previously roasted and in which a major gold-bearing constituent is a gold telluride, a process involving leaching the ore with a solvent containing free ammonia, an alkali or alkaline earth cyanide, and a sufficient amount of a compound of divalent copper to give the solution a distinct blue color.

COLIN G. FINK.
GARTH LOUIS PUTNAM.